April 30, 1929. E. B. FORSE 1,710,870
LABORATORY MUFFLE
Filed Sept. 2, 1927
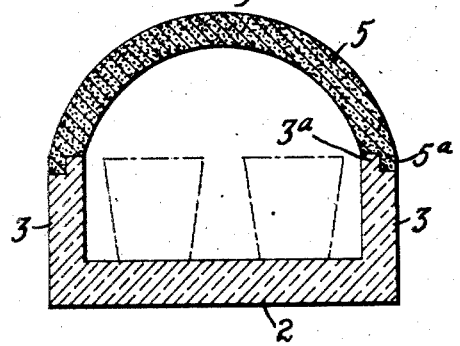
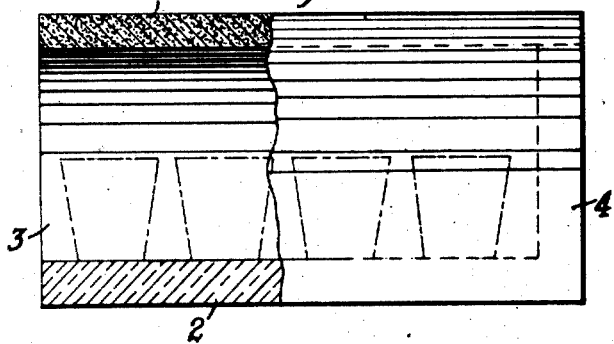
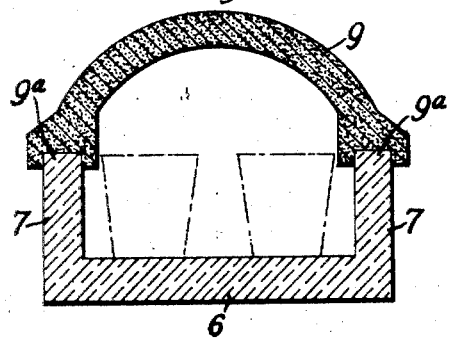
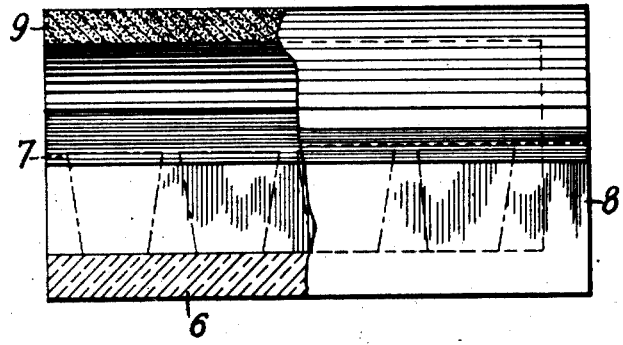
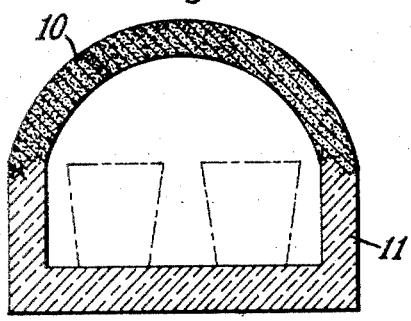
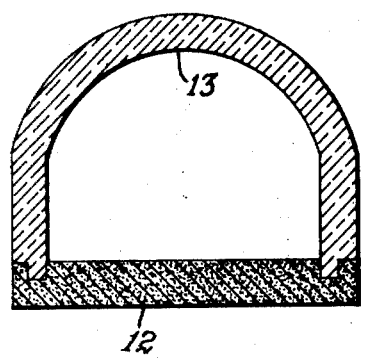
INVENTOR
Edwin B. Forse
by Byrnes, Stebbins & Larralde
his attorneys Patented Apr. 30, 1929.

1,710,870

UNITED STATES PATENT OFFICE.

EDWIN B. FORSE, OF METUCHEN, NEW JERSEY, ASSIGNOR TO THE CARBORUNDUM COMPANY, OF NIAGARA FALLS, NEW YORK, A CORPORATION OF PENNSYLVANIA.

LABORATORY MUFFLE.

Application filed September 2, 1927. Serial No. 217,074.

This invention is for a muffle or other heating chamber for use in connection with certain metallurgical operations, and relates more especially to a muffle for laboratory use for receiving crucibles or cupels.

The metallurgical laboratories of smelting companies use large number of assay muffles for heating crucibles and cupels. During the past few years, muffles have been manufactured of silicon carbide instead of fire clay. The silicon carbide muffles give a much longer life due to their freedom from cracking and because of the high refractory properties of silicon carbide. On account of the high thermal conductivity and heat permeability of silicon carbide, the analyst has been able to carry through the operation much more quickly and with less expenditure of fuel than is necessary with the usual type of fire clay muffle.

One difficulty which has been encountered with silicon carbide muffles is that in some operations, certain substances react with the silicon carbide to disintegrate the walls thereof. For instance, in some operations, lead oxide is given off, and this substance combines very actively with silicon carbide, and decomposes it. The result is that where a group of cupels are placed in a muffle, the vapors of lead oxide which arise from each cupel, will decompose a spot in the roof of the muffle above each cupel, and will sometimes bore a small hole right through the silicon carbide roof above each cupel.

To overcome this difficulty the present invention proposes to make a composite muffle having the walls least subject to attack formed of silicon carbide and having the walls which are most rapidly disintegrated by reaction with materials in the muffle made from some other refractory material which is resistant to the fumes arising from the cupels. As an example, where lead oxide is given off from cupels in the muffle, the sides and bottom are of silicon carbide, while the top is of a material resistant to lead oxide. One material which has been used with great success for the roof of a muffle where lead oxide is given off, is fused crystal alumina, such as is produced in large quantities for abrasive purposes and for refractory purposes. The action of lead oxide and other fumes which are given off in the cupelling operations, have very little action on fused alumina, and this form of composite muffle combines the advantages derived from the use of silicon carbide with the resistant properties of fused alumina and other substances, and thereby provides a muffle whose life will be greatly prolonged.

The invention may be readily understood by reference to the accompanying drawings in which Fig. 1 represents a vertical transverse section through one form of muffle embodying my invention;

Fig. 2 shows such a muffle partly in section and partly in side elevation;

Fig. 3 is a view similar to Fig. 1 of a slightly modified form of muffle;

Fig. 4 is a view similar to Fig. 2, of the form of muffle shown in Fig. 3;

Fig. 5 is a view similar to Fig. 1 of still another slightly modified form.

Fig. 6 is a view similar to Fig. 5 wherein the bottom of the muffle is more resistant than the sides and top thereof.

The muffle shown in Figs. 1 and 2 has a bottom 2, side walls 3 and an end wall 4, and all of these walls are formed of silicon carbide. According to a preferred embodiment of the invention, the silicon carbide mix consists of 90 parts of silicon carbide grains of graded fineness, 8 parts of fire clay and 6 parts of temporary binder. This is thoroughly mixed together until it has the consistency of an ordinary molding sand.

Over the top of the muffle is a roof 5 which is formed of some material more resistant to the fumes rising out of the cupels than is silicon carbide. This material is preferably formed of fused alumina, and the mixture from which it is formed preferably contains 85 parts of fused alumina grains of graded fineness, 15 parts of fire clay, and 2.7 parts of temporary binder. This mixture is thoroughly mixed and brought to the consistency of molding sand.

In the construction shown in Fig. 1, the top 5 is formed separately, the sides 3 having a tongue $3^a$ which overlaps a tongue $5^a$ on the top section. The top is thus fitted onto the body of the muffle. By reason of the muffle being formed of two parts, no strain is set up in the walls due to differences in the coefficients of expansion in the materials of which the sides and top are composed. Also, either part may be replaced, when necessary.

In the form of muffle shown in Figs. 3 and 4, the muffle has a bottom 6, sides 7, end 8, and a top 9. The bottom, sides, and end are formed of silicon carbide while the roof is formed of some substance more resistant to the fumes rising out of the cupels than is silicon carbide. This may be the material above mentioned, or any other suitable material. In this form of muffle, the roof or top 9, is formed separately from the body of the muffle and has a channel 9ª on its edges to engage the tops of the side walls 7.

In the construction shown in Fig. 5, the top 10 of the muffle is molded integrally with the sides, end, and bottom walls. The top 10 is of fused alumina or other resistant material, while the main body 11 of the chamber is of silicon carbide. The joint between the material of the top and that of the sides is uneven or ragged, so as to secure the best possible cohesion, and avoid the formation of any straight line of fracture between the two materials. With careful selection of materials and careful molding, cracking of the muffle by reasons of differences in this coefficients of expansion of the two materials, either in the initial firing, or subsequent use thereof, is avoided.

The muffle or chamber shown in Fig. 6 shows the materials reversed. The bottom 12 is of fused alumina or other resistant refractory while the body 13 of the chamber is of silicon carbide. This form is used where the bottom of the muffle or chamber is most likely to react with substances in the chamber.

Instead of using a fused alumina, other neutral or basic refractory materials may be used for the resistant portion of the muffle. For instance, fire clays of the kaolin type can be used, as well as fire clays high in alumina, sillimanite, magnesite, and fused magnesia.

The advantages of the invention arise out of the provision of one portion of the muffle or other chamber which is more resistant to the fumes coming out of the cupels or to other materials in the muffles than is silicon carbide, while the body of the muffle may still be composed of silicon carbide and the advantages of silicon carbide thus retained in the muffle.

While I have illustrated and described particular embodiments of my invention, it will be understood that the invention may be otherwise embodied, and that various changes and modifications may be made within the spirit of my invention and under the scope of the following claims.

I claim:

1. A heating chamber for metal recovery operations whose walls are comprised of at least two sections, one of which is of silicon carbide while the other is comprised of a refractory metallic oxide material, the latter forming that part of the structure which is more directly exposed to the action of oxidizing or easily reducible materials in the chamber, the former constituting the part through which most of the heat is transmitted to the chamber.

2. A muffle for cupelling operations comprising a main body portion having a bottom and sides composed of a material possessing a thermal conductivity at least three times that of fire clay and a roof for the muffle formed of a refractory metallic oxide more resistant to the fumes arising from the cupels than is the body of the muffle.

3. A cupelling muffle comprising a body portion composed of bonded granular silicon carbide and having a roof portion composed of neutral or basic refractory resistant to the action of lead oxide.

4. A cupelling muffle having a main body portion formed of bonded granular silicon carbide and having a refractory top more resistant to decomposition by lead oxide than silicon carbide.

5. A cupelling muffle, composed of a main body portion formed of bonded granular silicon carbide, and having a section which is composed of bonded fused aluminus oxide.

6. A cupelling muffle comprising a main body portion composed of bonded granular silicon carbide, and a separate roof section composed of a neutral or basic refractory.

7. A muffle for use in metal recovery operations having a main body portion which is composed of a material having a thermal conductivity more than three times that of fire clay and having the remaining portion thereof composed of refractory metallic oxides which are substantially nonreactive with respect to the metallic oxides and vapors given off in metal recovery operations.

8. A muffle for use in metal recovery operations having a main body portion composed of silicon carbide and having another portion thereof composed of a neutral or basic refractory which is substantially nonreactive with respect to the metallic oxides and vapors given off in metal recovery operations.

In testimony whereof I have hereunto set my hand.

EDWIN B. FORSE.